United States Patent
Park et al.

(10) Patent No.: US 10,212,323 B2
(45) Date of Patent: Feb. 19, 2019

(54) CAMERA MODULE

(71) Applicant: LG INNOTEK CO., LTD., Seoul (KR)

(72) Inventors: Sang Ok Park, Seoul (KR); Seong Min Lee, Seoul (KR); Jun Taek Lee, Seoul (KR); Byung Wook Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/413,610

(22) Filed: Jan. 24, 2017

(65) Prior Publication Data

US 2017/0134630 A1 May 11, 2017

Related U.S. Application Data

(63) Continuation of application No. 15/175,703, filed on Jun. 7, 2016, now Pat. No. 9,591,196, which is a (Continued)

(30) Foreign Application Priority Data

Nov. 5, 2013 (KR) .................. 10-2013-0133676
Nov. 5, 2013 (KR) .................. 10-2013-0133690

(51) Int. Cl.
*H04N 5/225* (2006.01)
*G03B 3/10* (2006.01)

(52) U.S. Cl.
CPC ............ *H04N 5/2257* (2013.01); *G03B 3/10* (2013.01); *H04N 5/2253* (2013.01); *G03B 2205/0069* (2013.01)

(58) Field of Classification Search
None
See application file for complete search history.

(56) References Cited

U.S. PATENT DOCUMENTS 8,004,780 B2 8/2011 Guitierrez et al.
2009/0278978 A1* 11/2009 Suzuki .................. G02B 7/08
348/345

(Continued)

FOREIGN PATENT DOCUMENTS

CN 101577790 11/2009
CN 102315748 1/2012

(Continued)

OTHER PUBLICATIONS

U.S. Office Action for U.S. Appl. No. 14/531,178 dated Oct. 27, 2015.
U.S. Notice of Allowance for U.S. Appl. No. 14/531,178 dated Mar. 1, 2016.

(Continued)

*Primary Examiner* — James M Hannett
(74) *Attorney, Agent, or Firm* — KED & Associates LLP

(57) ABSTRACT

A camera module includes a PCB (Printed Circuit Board) installed with an image sensor, a base mounted on the PCB, and a bobbin reciprocatingly mounted above the base. A bottom elastic member is fixed to the base to support the bobbin, and a terminal is installed at the base, one end of which is conductively connected to the PCB and the other end of which is conductively connected to the bottom elastic member at a solder part. A solder cut-off part is formed at the base to cut off movement of overflowing solder from the solder part.

19 Claims, 8 Drawing Sheets

Related U.S. Application Data continuation of application No. 14/531,178, filed on Nov. 3, 2014, now Pat. No. 9,380,193.

(56) References Cited

U.S. PATENT DOCUMENTS

| | | | | |
|---|---|---|---|---|
| 2010/0110270 A1* | 5/2010 | Sekimoto | ............ | H04N 5/2254 348/340 |
| 2010/0284081 A1* | 11/2010 | Gutierrez | ............... | G02B 7/102 359/554 |
| 2012/0008220 A1* | 1/2012 | Lee | .......................... | G03B 3/10 359/822 |
| 2012/0008221 A1* | 1/2012 | Min | .................... | H02K 41/0356 359/824 |
| 2012/0025633 A1* | 2/2012 | Lee | .................... | H02K 41/0356 310/12.16 |
| 2012/0050895 A1 | 3/2012 | Kotanagi | | |
| 2013/0107112 A1 | 5/2013 | Oh | | |
| 2013/0258189 A1 | 10/2013 | Lee | | |

FOREIGN PATENT DOCUMENTS

| | | |
|---|---|---|
| CN | 102332805 | 1/2012 |
| CN | 102385136 | 3/2012 |
| CN | 103095974 | 5/2013 |
| CN | 103262521 | 8/2013 |

OTHER PUBLICATIONS

Chinese Office Action dated Jul. 2, 2018 issued in Application 201410617382.2 (full Chinese text).

* cited by examiner

CAMERA MODULE

CROSS-REFERENCE TO RELATED APPLICATIONS

This application is a Continuation Application of U.S. patent application Ser. No. 15/175,703 filed Jun. 7, 2016, which is a Continuation Application of U.S. application Ser. No. 14/531,178, filed Nov. 3, 2014, which claims priority under 35 U.S.C. § 119 to Korean Application No. 10-2013-0133676 and Korean Application No. 10-2013-0133690, each filed on Nov. 5, 2013, whose entire disclosures are hereby incorporated by reference.

BACKGROUND

1. Field

Exemplary aspects of the present disclosure relate to a camera module.

2. Background

A camera module can perform an auto focusing function by arranging a lens barrel mounted with a plurality of lenses at an upper surface of a PCB (Printed Circuit Board) installed with an image sensor and by moving the lens barrel or at least one sheet of lens relative to the image sensor. The auto focusing function may be implemented by various actuators, where an auto focusing method using a VCM (Voice Coil Motor) is generally employed.

In the VCM, a magnet is mounted at a holder member, which is fixedly mounted at an upper surface of the PCB. A bobbin is vertically and reciprocatingly arranged at a position opposite to that of the magnet, where the bobbin is wound with a coil at a periphery. The bobbin is mounted at an inner surface with a lens barrel having a plurality of lenses. The coil is electrically connected to the PCB, and to this end, a terminal of conductive material is soldered to a metal-materialed elastic member to elastically support the bobbin.

When the terminal is soldered to a bottom elastic member as noted above, the terminal and the bottom spring are applied to a structure formed with mutually different members, where a soldered position corresponds to a contact surface between an upper surface of the bottom spring and a terminal boss of terminal so formed as to contact the bottom spring.

The contact surface between the terminal and the bottom spring is so formed as to allow a maximum electrical connection. However, there disadvantageously occurs a problem of solder overflow depending on workmanship, because the soldering process is manually done. Particularly, due to miniaturization of mobile devices, the size of camera module is decreased to result in generation of frequent soldering defects, from which bad assembly or erroneous operation is caused.

Furthermore, an empty space is generated as large as thickness of the bottom elastic member, through which foreign objects may be introduced into a camera module.

Meanwhile, the bobbin performs an auto focusing function while reciprocating in parallel with an axial direction. At this time, the bobbin reciprocates in repetitive contact with a base, whereby the bobbin or the base may be damaged through the repetitive contact. In order to avoid this problem, a plurality of bosses is separately formed at a surface opposite to the base of the bobbin to allow a floor surface of the boss to surface-contact the base.

Furthermore, the base is mounted with an IR (Infrared) cut-off filter at a position opposite to the image sensor, where the bobbin frequently contacts the base at a position near to a contact surface of the IR cut-off filter. Thus, there is a need to reduce the size of the boss, so that interference with the IR cut-off filter can be prevented. As a result, the boss may be frequently damaged by repetitive use or external shock.

When the boss is damaged, foreign objects generated therefrom can pollute the IR cut-off filter arranged at a position near to the boss, and when the IR cut-off filter is polluted by the foreign objects, a pale round image or a black spot is generated on the image of the camera module, resulting in generation of bad camera module.

BRIEF DESCRIPTION OF THE DRAWINGS

The embodiments will be described in detail with reference to the following drawings in which like reference numerals refer to like elements wherein.

DETAILED DESCRIPTION

Figure 1:
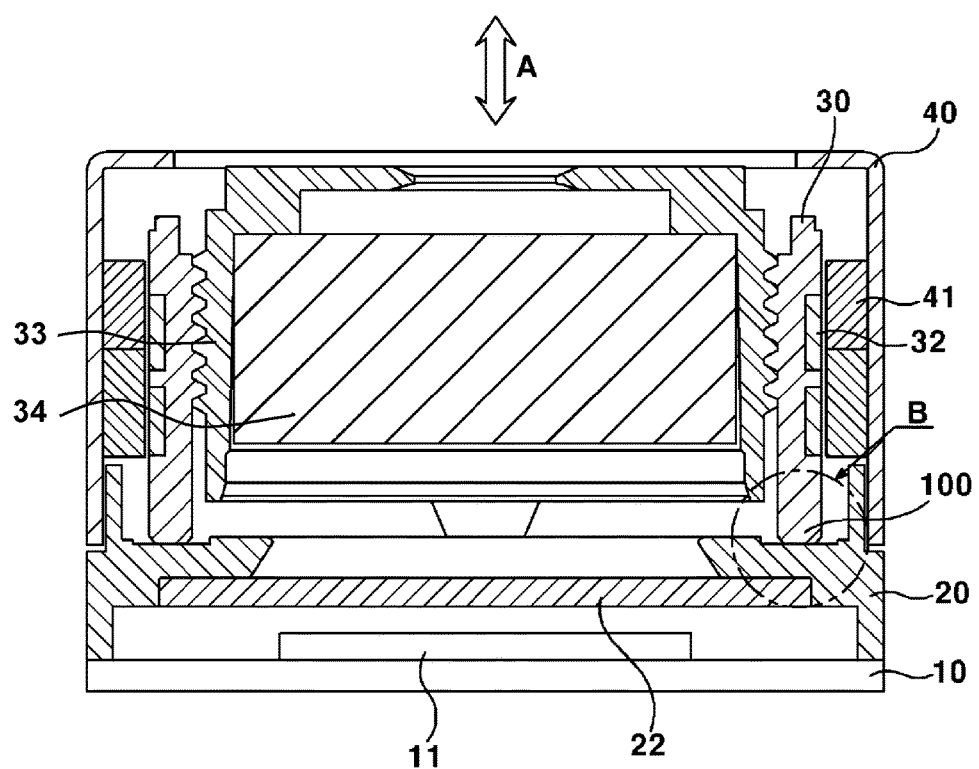
FIG. 1 is a schematic cross-sectional view illustrating a camera module according to the present disclosure.
Figure 2:
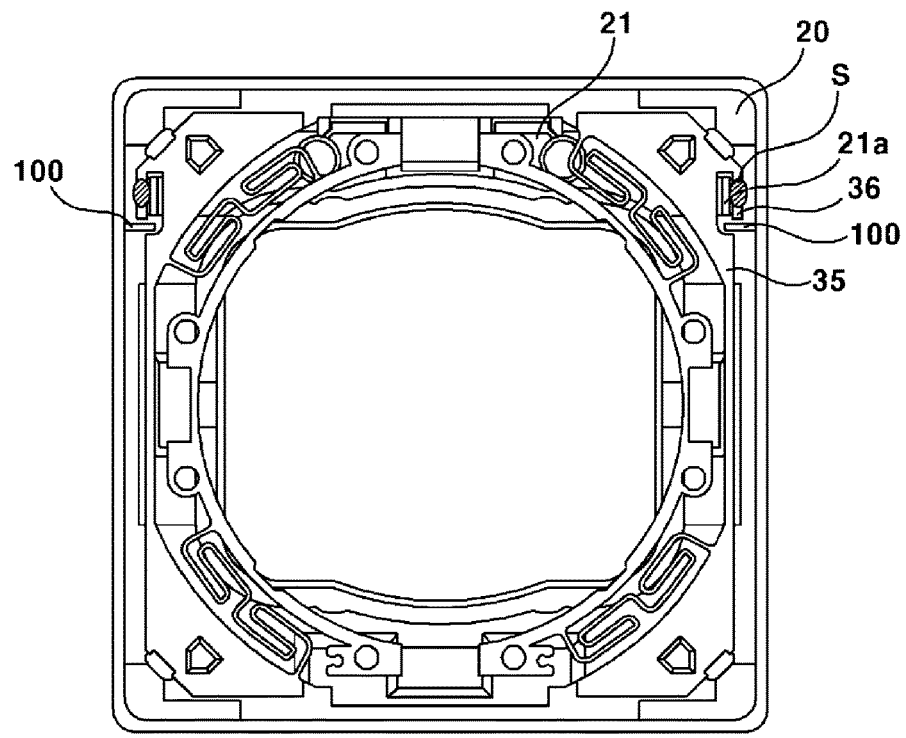
FIG. 2 is a plane view illustrating connectivity between a bottom elastic member and a terminal of FIG. 1.

Referring to FIGS. 1 and 2, a camera module according to an exemplary embodiment of the present disclosure may include a PCB (Printed Circuit Board, 10), a base (20), a bobbin (30) and a cover (40). The PCB (10) is installed at an upper side with an image sensor (11), and the PCB (10) is mounted at an upper side with the base (20).

An IR (Infrared) cut-off filter (22) may be installed at a position opposite to the image sensor (11) to prevent a light of infrared wavelength from being transferred to the image sensor (11). In order to protect the image sensor (11), a sensor holder may be additionally disposed between the PCB (10) and the base (20). The sensor holder may be a tube-shaped member enclosing a periphery of the image sensor (11). The sensor holder may be formed integrally with the base (20). The base (20) may be installed with a terminal (21), where one end of the terminal (21) may be conductively connected to the PCB (10) and the other end of the terminal (21) may be conductively connected to a bottom elastic member (35) via soldering.

The terminal (21) may be variably configured depending on design with a conductive material like a metal. The terminal (21) may be formed by bending a member at least twice and coupling the bent member to the base (20). The terminal (21) may be insert-injection molded into the base, for example. The exemplary embodiment of the present disclosure has illustrated the terminal (21) that is coupled by forming a member separate from the base (20).

Figure 3:
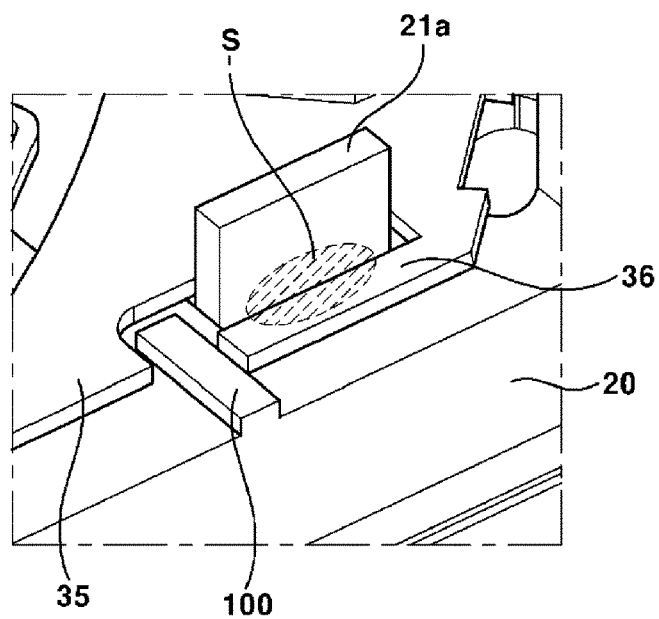
FIG. 3 is a perspective view illustrating connectivity between a bottom elastic member formed with a solder cut-off part and a terminal according to a first exemplary embodiment of the present disclosure.

FIGS. 2 and 3 are views illustrating connectivity between a bottom elastic member (35) and a terminal (21) according to a first exemplary embodiment to the present disclosure. One end of the terminal (21) may be formed at a part, where the terminal (21) and the bottom elastic member (35) are electrically connected, with a terminal end part (21a) that passes through the bottom elastic member (35) from a lower side to an upper side. The bottom elastic member (35) may be formed at a part adjacent to the terminal end part (21a) with a terminal connection part (36) configured to at least partially enclose a surrounding of the terminal end part (21a).

The terminal end part (21a) may be integrally formed in one body with the terminal (21) and may be formed by bending one end of the terminal (21). The terminal connection part (36) may be a part of the bottom elastic member (35) and take a shape of a branch by cutting a part of the bottom elastic member (35) while the cut part accommodates the terminal end part (21a) like a slot. The terminal connection part (36) of the bottom elastic member (35) may make the cut part take a shape of a hole, instead of a slot by expanding to enclose the terminal end part (21a).

The terminal end part (21a) and the terminal connection part (36) are conductively connected at the solder part (S) via soldering and may transfer an electric power supplied from the PCB (10) to a coil (32) through the bottom elastic member (35). The solder part (S) may be formed at a contact position between an upper surface of the terminal connection part (36) of the bottom elastic member (35) lifted on an upper surface of the base (20) and the terminal end part (21a). A solder coated on the soldering part (S) is preferred not to spread on a space other than the solder part (S) and a surface of the bottom elastic member (35).

However, the solder may overflow to a section other than the solder part (S) due to operator failure during the soldering operation as the camera module is miniaturized. The exemplary embodiment of the present disclosure teaches the solder cut-off part formed on the base (20) in order to minimize the overflow of solders, the details of which will be described later.

The bobbin (30) may be vertically movably mounted at an upper side of the base (20). An initial position of the bobbin (30) may be any one of an upper surface of the base (20) and a space between the base (20) and the cover member (40). The bobbin (30) may be protrusively formed at a floor surface with a boss (31). The boss (31) may surface-contact the base (20). The boss (31) will be described in detail later.

The bobbin (30) may be wound at a periphery with a coil (32), and when a current flows in the coil (32), the bobbin (30) may perform a reciprocating movement to 'A' arrow direction of FIG. 1 in response to electromagnetic interaction with a magnet (41) mounted on the cover member (40).

The bobbin (30) may be formed at an inner circumferential surface with a screw thread to which a lens barrel (33) mounted with more than one lens (34) is threaded on. However, the coupling between the lens barrel (33) and the bobbin (30) is not limited only to the screw combination, but may be integrally formed free from screws, or a thread-less lens barrel is coupled to the bobbin using an adhesive.

Referring to FIG. 1, the cover member (40) may be arranged at an upper surface of the base (20), and the cover member (40) may be formed at an inner circumferential surface with a magnet (41) to face the coil (32). The cover member (40) may be formed at an outermost surface of the camera module as illustrated in FIG. 1, but the present disclosure is not limited thereto. It is possible to arrange a separate housing member to wrap an external side of the cover member (40), if necessary. Furthermore, the cover member (40) may be formed with a metal material, and may serve the function of a yoke.

The camera module according to the present disclosure may be arranged with an upper elastic member (not shown) and a bottom elastic member (35) to elastically support the reciprocating operation of the bobbin (30). The upper elastic member and the bottom elastic member (35) may be connected at one end to the cover member (40) or the base and connected at the other end to an upper end and a bottom end of the bobbin (30). The bottom elastic member (35) may be integrally formed with a terminal supplying an electric power to the coil (32) wound on the bobbin (30) by bending the bottom elastic member.

A spacer may be interposed between the cover member (40) and the bottom elastic member. The spacer is installed to insulate the bottom elastic member from the cover member (40), and it is possible to replace the function of spacer by changing a shape of the base (20). Furthermore, the camera module may further include a housing member such as a shield can configured to wrap the cover member (40) comprising of the external shape of the camera module.

At this time, the housing member may be centrally arranged with a lens hole with a size corresponding to that of the lens to allow an outside image to be transferred to the image sensor through a lens arranged at an inner side of the bobbin (30), whereby the outside image can be transferred to the image sensor (11) through the lens hole. The housing member may perform an electromagnetic shielding function by being provided with a metal material, but the present disclosure is not limited thereto, and if necessary, the outermost side of the camera module may be formed with a resin material, or with other metal materials.

Furthermore, the housing member and the yoke may be integrally formed free from a separate housing member. In other words, instead of forming the housing member to wrap the yoke for reduction of size of the camera muddle, the yoke and the housing member may be integrally formed.

As illustrated in FIG. 1, the camera module according the first exemplary embodiment of the present disclosure may be installed with a solder cut-off wall as a solder cut-off part for preventing solders of the solder part (S) configured to electrically connect the terminal end part (21a) of the terminal (21) to the terminal connection part (36) from overflowing.

Referring to FIGS. 2 and 3, the solder cut-off wall (100) may be protrusively formed to an upward direction at a position corresponding to that of an opening of the terminal connection part (36) formed by cutting the bottom elastic member (35) to at least enclose the terminal end part (21a).

Even if a larger quantity of solder than desired amount of the solder part (S) illustrated in FIGS. 2 and 3 profusely overflows, the overflowing solder may be prevented from spreading near to a body of the bottom elastic member (35) by the solder cut-off wall (100). Foreign objects generated by the solder pollution can be prevented from polluting the IR cut-off filter (22) and/or the image sensor (11) side of the camera module. The solder cut-off part may be formed in various shapes in addition to a single wall type solder cut-off part.

Figure 4:
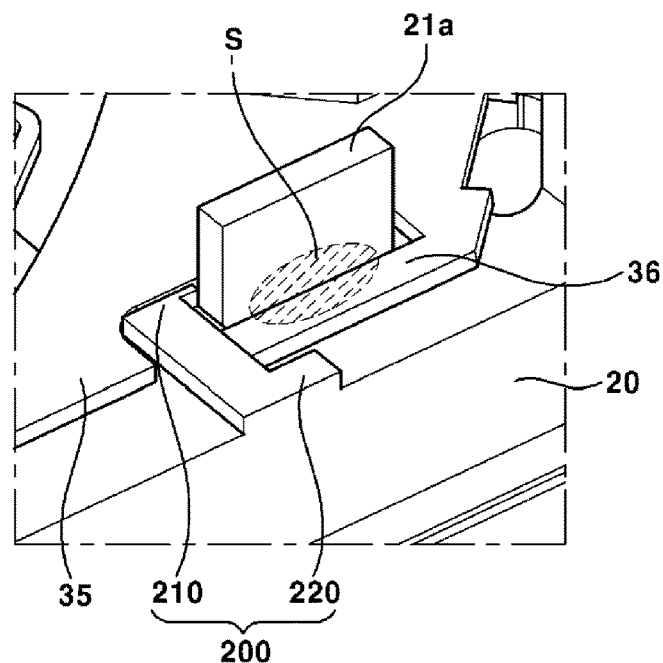
FIG. 4 is a perspective view illustrating connectivity between a bottom elastic member formed with a solder cut-off part and a terminal according to a second exemplary embodiment of the present disclosure.

For example, the solder cut-off part, as that of the second exemplary embodiment of the present disclosure illustrated in FIG. 4, may be formed in a shape of a multiple cut-off wall (200). The multiple cut-off wall (200) may include a first cut-off wall (210) formed at a position corresponding to that of an opening of the terminal connection part (36) of the bottom elastic member (35), and a second cut-off wall (220) formed in parallel with the terminal connection part (36) and shorter than the terminal connection part (36).

The first cut-off wall (210) may perform the function of the solder cut-off wall according to the first exemplary embodiment of the present disclosure, and the second cut-off wall (220) may prevent the over-flown solder from over-flowing to a lateral wall side of the base (20) by forming a concave accommodation part along with the first cut-off wall (210). The first and second cut-off walls (220, 220) may be integrally formed with the base 20.

Figure 5:
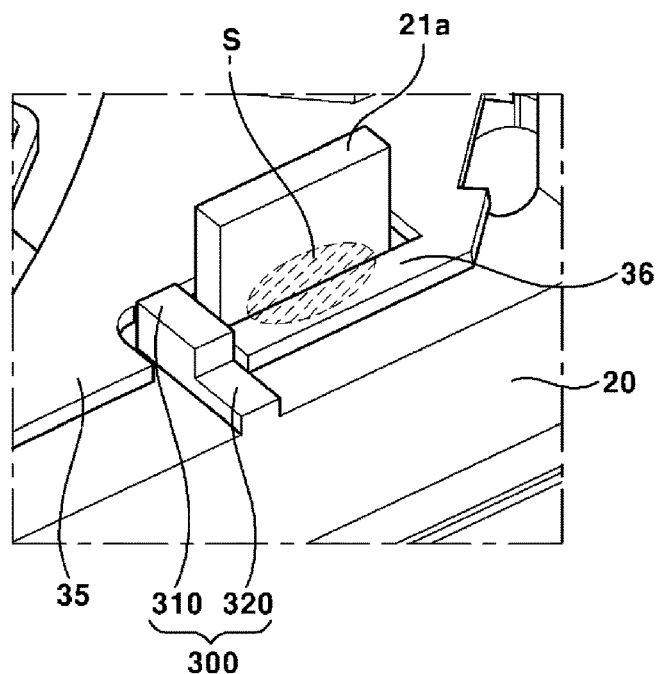
FIG. 5 is a perspective view illustrating connectivity between a bottom elastic member formed with a solder cut-off part and a terminal according to a third exemplary embodiment of the present disclosure.

The solder cut-off part may be formed with a dual cut-off wall (300) as FIG. 5. The dual cut-off wall (300) may include includes a primary cut-off wall (310) and a secondary cut-off wall (320). The primary cut-off wall (310) is arranged at a position corresponding to that of the opening of the terminal connection part (36) of the bottom elastic member (35) and protruded upward from a part adjacent to the solder part (S) at a first height. A secondary cut-off wall (320) protrudes from the primary cut-off wall at a second height lower than the first height. The primary cut-off wall (310) and the secondary cut-off wall (320) may be provided in a staircase or stepped shape as illustrated.

The first height may have a value larger than a thickness of the bottom elastic member (35). The rationale is that a relatively large quantity of solder can be prevented from over-flowing compared with the secondary cut-off wall (320), because the primary cut-off wall (310) is arranged near to the solder part (S). Furthermore, the secondary cut-off wall (320) may be formed with a thickness corresponding to that of the bottom elastic member (35).

Figure 6:
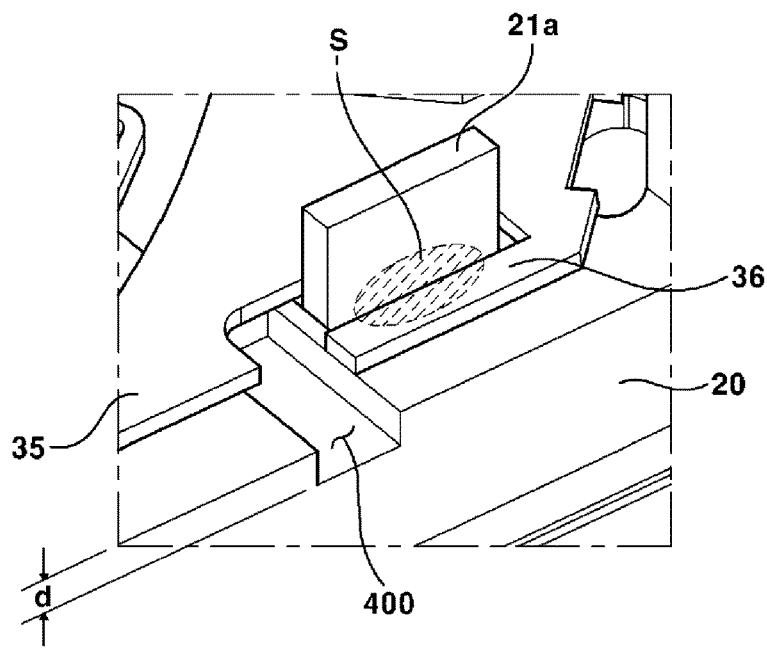
FIG. 6 is a perspective view illustrating connectivity between a bottom elastic member formed with a solder cut-off part and a terminal according to a fourth exemplary embodiment of the present disclosure.

The solder cut-off part according to the fourth exemplary embodiment as illustrated in FIG. 6 may be formed with a solder cut-off trap (400), which is a concave groove having a predetermined depth (d). Although the shape of the concave groove may have a same width and length as the solder cut-off wall (100) protrusively formed at a predetermined height according to the first exemplary embodiment, there is a difference in that the groove is formed in a concaved groove shape. The depth (d) may be formed not exceeding the thickness of the base (20). According to the foregoing configuration, the excess solder is prevented from spreading to a surrounding of the bottom elastic member (35), because the excess solder from the solder part (S) flows into the concave inner space of the solder cut-off trap (400).

Figure 7:
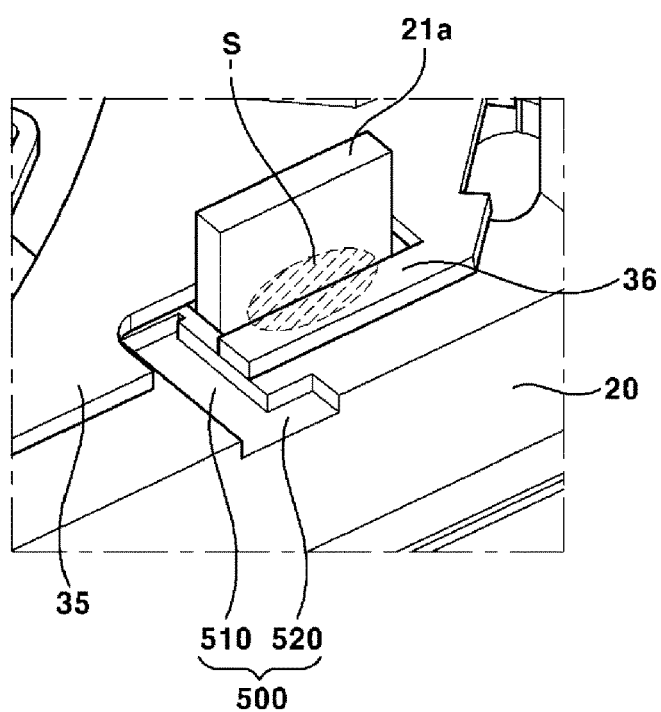
FIG. 7 is a perspective view illustrating connectivity between a bottom elastic member formed with a solder cut-off part and a terminal according to a fifth exemplary embodiment of the present disclosure.

The solder cut-off part according to the fifth exemplary embodiment of the present disclosure as illustrated in FIG. 7 may be provided with a multiple solder cut-off trap (500) which is formed by a series of single traps (510, 520), and may be formed with a concave groove as illustrated in FIG. 4. Although the shape of the concave groove may correspond to that of the multiple cut-off wall (200) according to the second exemplary embodiment, there is a difference in that the groove is formed in a concaved groove shape. The difference from the fourth exemplary embodiment is that an inner space is formed in which the over-flown solder can move, such that the excess solder can be maximally prevented from being protruded upward of the solder cut-off trap (500).

The multiple solder cut-off trap (500) may include a first trap (510) corresponding to an opening of the terminal connection part (36) of the bottom elastic member (35), and a second trap (520) configured in parallel with the terminal connection part (36) and shorter than the terminal connection part (36). The first trap (510) may perform the function of the solder cut-off trap (400) according to the fourth exemplary embodiment, and the second trap (520) may form a concave accommodation part along with the first trap (510) to provide a space in which the excess solder can accumulate.

Figure 8:
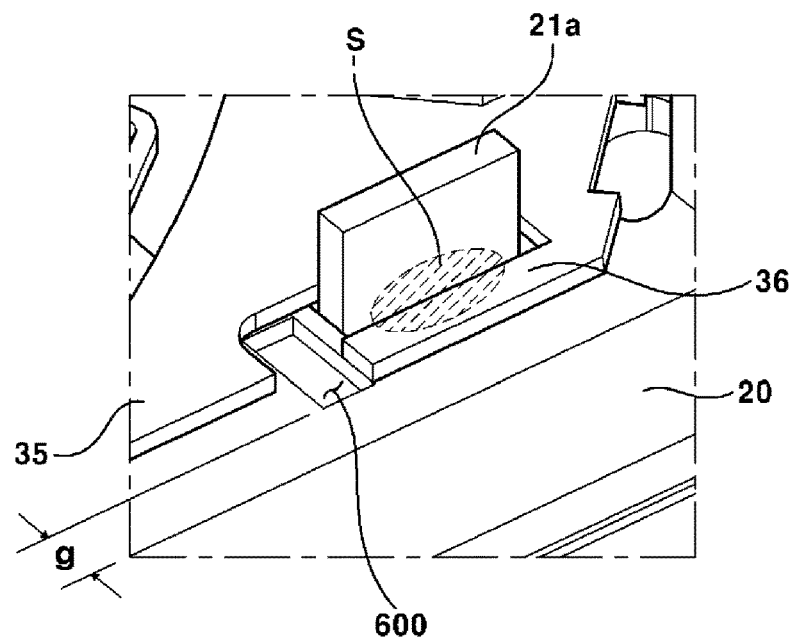
FIG. 8 is a perspective view illustrating connectivity between a bottom elastic member formed with a solder cut-off part and a terminal according to a sixth exemplary embodiment of the present disclosure.

The solder cut-off part according to the sixth exemplary embodiment of the present disclosure illustrated in FIG. 8 illustrates a partial solder cut-off trap (600). The difference is that, unlike the fourth exemplary embodiment, a position of the partial solder cut-off trap (600) is spaced apart from the periphery of the base (20) at a predetermined distance (g) not to form an opening to a periphery side of the base (20), whereby the over-flown solder is prevented from overflowing to a periphery side of the base (20).

Meantime, when a solder cut-off part is formed in a concaved groove shape as in the fourth to sixth exemplary embodiments, there may be am unwanted possibility of the foreign objects being introduced into the camera module through the concave groove part. Albeit not being illustrated, in case of the fourth to sixth exemplary embodiments, assembly may be performed by forming a protruding structure corresponding to that of the solder cut-off part at an assembly counterpart coupled to upward of the base (20).

For example, as illustrated in FIG. 1, introduction of foreign objects may be prevented by forming, at a position corresponding to that of the solder cut-off part of the cover member (40) assembled at an upper surface of the base (20), a protruding rib corresponding in shape to the abovementioned solder cut-off trap (400), the multiple solder cut-off trap (500) or a partial solder cut-off trap (600).

When the solder cut-off part is formed at the base (20) according to the first to sixth exemplary embodiments, the over-flow of solder from the solder part (S) can be interrupted to prevent the bottom elastic member (35) from being polluted by the excess solder.

Figure 9:
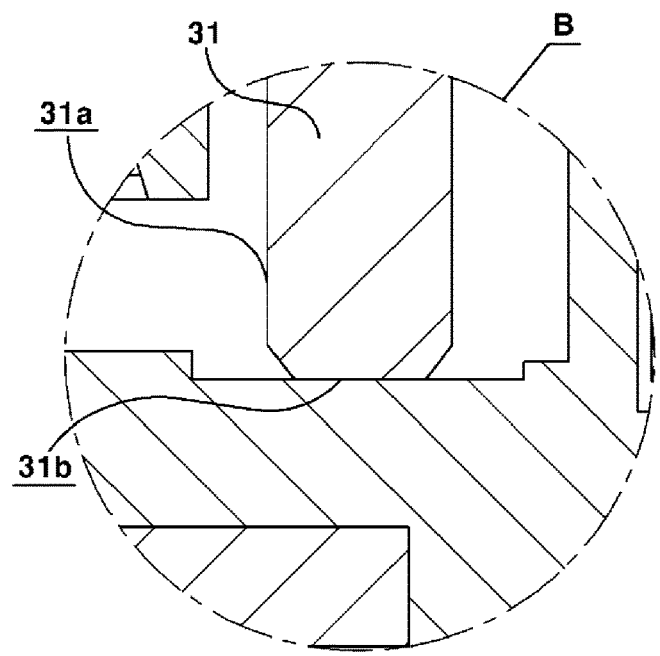
FIG. 9 is a cross-sectional view enlarging 'B' part of FIG. 1.
Figure 10:
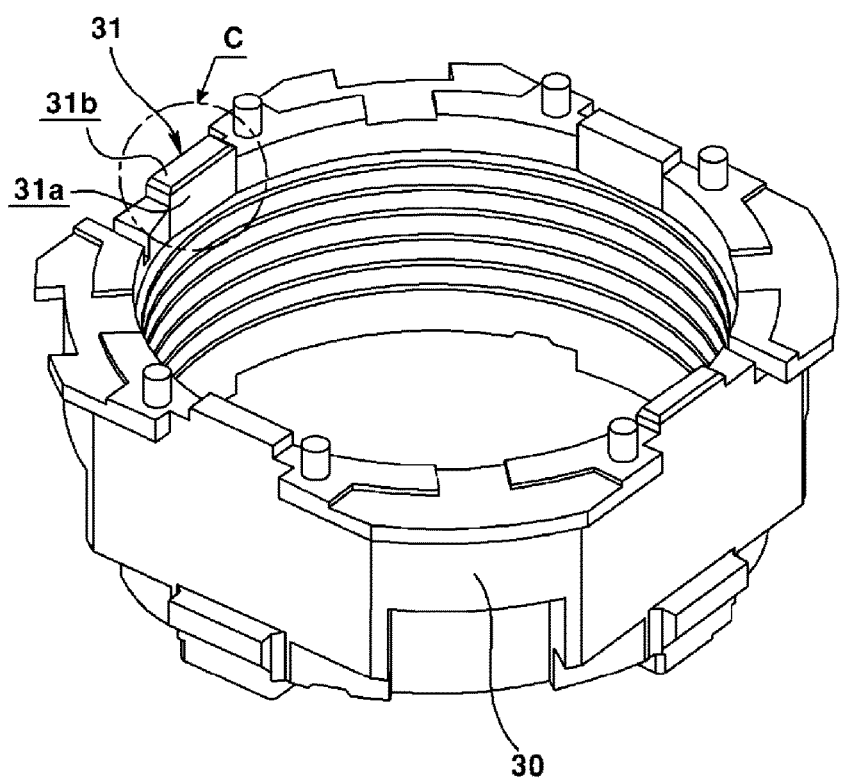
FIG. 10 is a perspective view illustrating a floor surface of a bobbin of FIG. 1 seen from a lower side.
Figure 11:
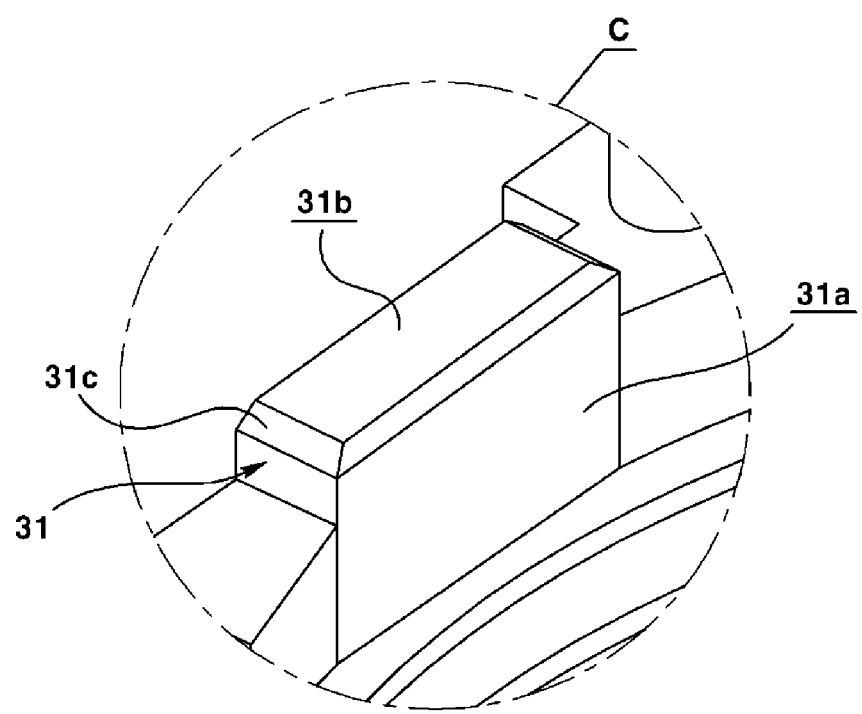
FIG. 11 is a perspective view enlarging 'C' part of FIG. 1.
Figure 12:
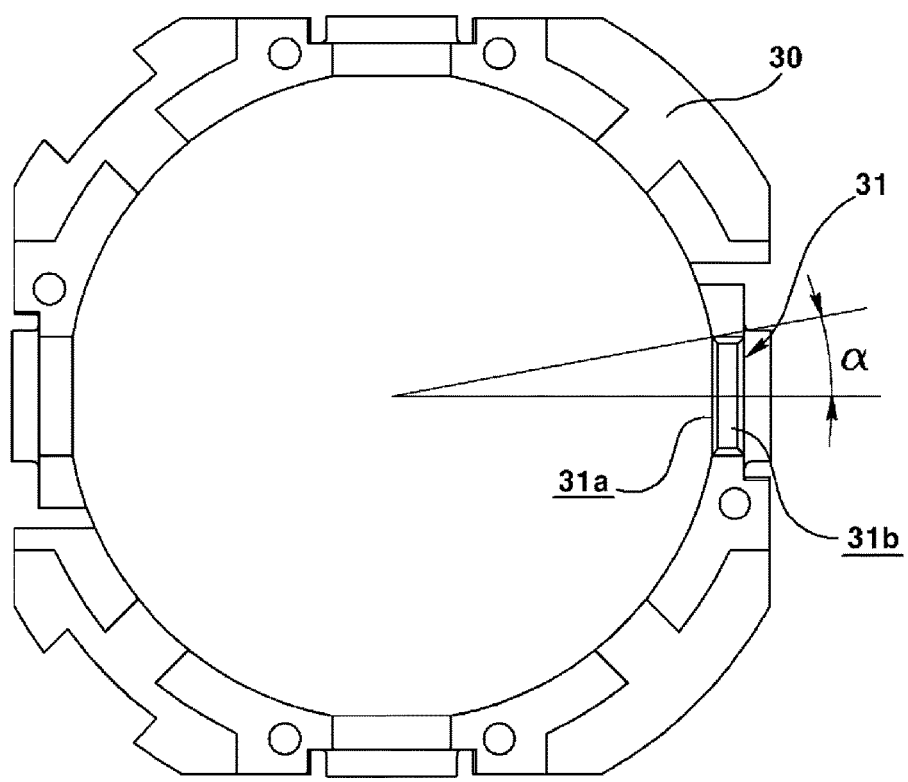
FIG. 12 is a plane view illustrating a floor surface of a bobbin of FIG. 1 seen from a lower side.

FIG. 9 is a cross-sectional view enlarging 'B' part of FIG. 1, FIG. 10 is a perspective view illustrating a floor surface of a bobbin of FIG. 1 seen from a lower side, FIG. 11 is a perspective view enlarging 'C' part of FIG. 1, and FIG. 12 is a plane view illustrating a floor surface of a bobbin of FIG. 1 seen from a lower side.

A boss (31) may be formed at a surface opposite to a bottom surface of the bobbin (30), that is, at a surface opposite to the base (20). The boss (31) may take a protruding shape protruded from the bottom surface of the bobbin (30), and a bottom surface thereof, that is, a floor surface, may comprise a flat plane surface to allow surface-contacting the base (20).

The boss (31) may be formed in any number, as necessary and at any place as long as the place is a floor surface of the bobbin (30). For example, the boss (31) may be installed at an external side surface of the cover member (40), at a place near to the cover member (40) or at a place farthest from the cover member (40). The boss (31) may be also formed at a place corresponding to a corner of the cover member (40), and may be formed at places corresponding to four lateral surfaces of the cover member (40).

Furthermore, as illustrated in FIGS. 9 to 11, an area of a floor surface (31b) at the boss (31) may be narrower than a cross-section of a body of the boss (31), and to this end, a chamfer (31c) may be formed at a circumference of the floor surface (31b) of the boss (31).

The bobbin (30) may take an approximate shape of a hollow cylinder and must have a thin thickness for wall body in order to miniaturize the camera module. However, the boss (31) receives more shocks and loads than other parts because of contact with the base (20). Thus, the boss (31) is required to be formed with a thickness thicker than other parts of the bobbin (30). To this end, the boss (31) is preferred to have a different cross-sectional shape than that of a conventional cylindrical wall body.

For example, the boss (31) may take a shape of a surface facing an optical axis, that is, a plane shape at an inner wall surface (31a). As a result, an inner circumferential surface of the bobbin (30) may take a shape alternately formed with a curved section and a plane section. As illustrated in FIGS. 10 to 12, the inner wall surface (31a) of the boss (31) may form a straight section at the inner circumferential surface of the bobbin (30) shown in a curved section on a cross-section perpendicular to the optical axis. At this time, as illustrated in FIG. 12, an angle ($\alpha$) formed between an imaginary line (a) connecting a center of the bobbin (30) to a center of the boss (31) and an imaginary line (b) connecting a center of the bobbin to a distal end of one side of the boss may be less than 12 degrees at the inner wall surface (31a) forming the straight section. The angle ($\alpha$) according to an optimal exemplary embodiment may be formed not exceeding 11 degrees, and may be formed at 10.16 degrees.

The inner wall (31a) of the boss may be extended within a so-called non-screw thread section of the bobbin along an optical axial direction from a bottom end of the bobbin (30). Although the non-screw thread section at an entire inner surface of the bobbin (30) may be reinforced with as much as a thickness of the inner wall surface (31a), it is difficult to add a reinforcement on all sections for assemble of the lens barrel (33).

By this configuration, it is possible to increase a thickness of reinforcement of the boss compared with the conventional structure, and this was confirmed by drop tests that the damage to a floor surface of a relevant boss was restricted.

Meantime, as noted from the foregoing, the configuration of reinforcing the inner surface of the boss (31) may be possible when a ratio between a size of external look of the camera module and size of a minor diameter of the bobbin (30) is less than 1.5:1. In other words, when a diameter of the bobbin greater than the size of the VCM is greater, a non-screw thread section may be employed.

An applicability based on ratio of bobbin according to the size of the generally well used VCM may be defined by the following table 1.

TABLE 1

(unit: mm)

| External size of VCM | Minor diameter of bobbin | ratio | remarks |
|---|---|---|---|
| 7.5 | 5 | 1.50:1 | applicable |
| 7.5 | 5.5 | 1.36:1 | applicable |
| 8.0 | 5.5 | 1.45:1 | applicable |
| 8.0 | 5 | 1.60:1 | inapplicable |

The present disclosure provides a camera module improved in durability of boss.

There is provided a camera module, the camera module comprising: a PCB (Printed Circuit Board) installed with an image sensor; a base mounted on the PCB; a bobbin reciprocatingly mounted above the base; a bottom elastic member fixed to the base to support the bobbin; a terminal installed at the base, one end of which is conductively connected to the PCB, and the other end of which is conductively connected to the bottom elastic member at a solder part; and a solder cut-off part formed at the base to cut off movement of overflown solder from the solder part. The solder cut-off part may be a solder cut-off wall protruded upward from the base. The solder cut-off wall may include first and second cut-off walls configured to form a concave groove by enclosing the terminal. The solder cut-off wall may include a primary cut-off wall protruded upward from the base, and a secondary cut-off wall protruded upward from the primary cut-off wall.

The solder cut-off part may be a solder cut-off trap formed at a predetermined depth. The solder cut-off trap may be one of a multiple solder cut-off trapformed by a series of single traps, and a partial solder cut-off trap spaced apart from an external surface of the base at a predetermined distance.

There is also provided a camera module, the camera module comprising: a PCB (Printed Circuit Board) installed with an image sensor; a base mounted on the PCB; and a bobbin protrusively formed with a boss to contact the base, wherein an inner wall of the boss is a plane extensively formed within a non-screw thread section of the bobbin along an optical axial direction.

The inner wall of the bobbin may be alternately formed on a cross-section perpendicular to an optical axis with a curved section and a straight section. The boss may be so formed as to have an area narrower at a floor surface contacting the base than that of a cross-section perpendicular to an optical axis of the boss. The boss may be formed at a periphery of its floor surface with a chamfer. The boss may be symmetrically arranged in plural number about the bobbin.

An inner wall of the boss may form a straight section connected to a curved section of the inner surface on a cross-section perpendicular to an optical axis of the bobbin, wherein an angle ($\alpha$) formed between an imaginary line (a) connecting a center of the bobbin to a center of the boss and an imaginary line (b) connecting a center of the bobbin to a distal end of one side of the boss is less than 12 degrees.

The present disclosure has an advantageous effect in that a solder cut-off part configured to prevent overflow of solder is installed at a position near to a solder part, whereby solder is prevented from polluting a surface of a bottom elastic member by overflowing at a surrounding of the solder part.

Another advantageous effect is that thickness of boss is reinforced by using an inner space of a bobbin to improve durability of boss free from increased size of bobbin, whereby damage of base can be minimized when the base and the boss repetitively collide during auto focusing operation.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A VCM (Voice Coil Motor), the VCM comprising:
a cover member;
a bobbin disposed in the cover member;
a coil disposed on the bobbin;
a magnet disposed on the cover member and facing the coil;
a base spaced apart from the bobbin and comprising a corner region;
a lower elastic member coupled with the bobbin and the base, and comprising an inner part coupled to the bobbin, an outer part coupled to an upper surface of the base, a connection part connecting the inner part and the outer part, and a terminal connection part,
a terminal disposed on the base and comprising a terminal end part protruding from the upper surface of the base;
a conductive member connecting the terminal end part of the terminal and the terminal connection part of the lower elastic member; and
a recess recessed from the upper surface of the base and formed at the corner region of the base,
wherein the recess is opened toward an outer lateral side of the base, and
wherein the recess is formed at a position adjacent to the lower elastic member and the conductive member.

2. The VCM of claim 1, wherein the bobbin comprises a boss protruding from a bottom surface of the bobbin,
wherein the boss of the bobbin is configured to contact the base by movement of the bobbin,
wherein the bobbin comprises an inner wall surface forming a hole, and
wherein the inner wall surface of the bobbin comprises a screw thread section formed with a screw thread, and a non-screw thread section.

3. The VCM of claim 2, wherein an inner surface of the boss toward an optical axis is a plane surface.

4. The VCM of claim 3, wherein the plane surface of the boss extends within the non-screw thread section of the bobbin in a direction of the optical axis.

5. The VCM of claim 2, wherein the non-screw thread section of the inner wall surface of the bobbin comprises four plane surfaces spaced apart from each other, and
wherein the four plane surfaces are connected with four curved surfaces at the non-screw thread section.

6. The VCM of claim 1, wherein the bobbin comprises a boss protruding from a bottom surface of the bobbin,
wherein the boss of the bobbin is configured to contact the base by movement of the bobbin,
wherein the bobbin comprises an inner wall surface forming a hole, and
wherein the inner wall surface of the bobbin is alternately formed on a cross-section perpendicular to an optical axis with a curved section and a straight section.

7. The VCM of claim 2, wherein the boss of the bobbin is formed to have an area narrower at a bottom surface contacting the base than that of a cross-section of the boss perpendicular to an optical axis.

8. The VCM of claim 2, wherein the boss comprises a chamfer formed at a periphery of a bottom surface of the boss.

9. The VCM of claim 2, wherein the boss is symmetrically arranged in plural number about an optical axis.

10. The VCM of claim 1,
wherein the bobbin comprises a boss protruding from a bottom surface of the bobbin,
wherein the boss of the bobbin is configured to contact the base by movement of the bobbin,
wherein an inner surface of the boss forms a straight section connected to a curved section of the inner surface on a cross-section perpendicular to an optical axis of the bobbin, and
wherein an angle (a) formed between an imaginary line (a) connecting a center of the bobbin to a center of the boss and an imaginary line (b) connecting a center of the bobbin to a distal end of one side of the boss is less than 12 degrees.

11. The VCM of claim 1, wherein the recess is disposed next to the conductive member.

12. The VCM of claim 1, wherein the recess is neighbored with the conductive member.

13. The VCM of claim 1, wherein the recess is configured to accommodate at least a portion of the conductive member.

14. The VCM of claim 1, wherein the recess has a first length corresponding with a length inwardly recessed from an outer lateral surface of the base, and a second length corresponding with a length downwardly recessed from the upper surface of the base,
wherein the first length is longer than the second length.

15. The VCM of claim 1,
wherein a portion of the lower elastic member is disposed at a position corresponding to that of the recess of the base.

16. The VCM of claim 1,
wherein a portion of the lower elastic member is overlapped with the recess of the base in a direction of an optical axis.

17. The VCM of claim 1, wherein the lower elastic member is electrically connected with the coil.

18. A camera module, the camera module comprising:
a PCB (Printed Circuit Board);
an image sensor disposed on the PCB;
the voice coil motor of claim 1 disposed on the PCB; and
a lens coupled with the bobbin of the voice coil motor.

19. A mobile device, the mobile device comprising the camera module of claim 18.

* * * * *